(12) United States Patent
Kasaiezadeh Mahabadi et al.

(10) Patent No.: US 10,919,572 B2
(45) Date of Patent: Feb. 16, 2021

(54) CONTROLLING A VEHICLE BASED ON TRAILER SWAY

(71) Applicant: GM GLOBAL TECHNOLOGY OPERATIONS LLC, Detroit, MI (US)

(72) Inventors: SeyedAlireza Kasaiezadeh Mahabadi, Shelby Township, MI (US); Jinsong Wang, Troy, MI (US); Bakhtiar B. Litkouhi, Washington, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 196 days.

(21) Appl. No.: 16/002,425

(22) Filed: Jun. 7, 2018

(65) Prior Publication Data

US 2019/0375454 A1 Dec. 12, 2019

(51) Int. Cl.
*B62D 13/00* (2006.01)
*B62D 13/02* (2006.01)

(52) U.S. Cl.
CPC ......... *B62D 13/005* (2013.01); *B62D 13/025* (2013.01)

(58) Field of Classification Search
CPC .... B62D 13/005; B62D 13/025; B62D 13/00; B60W 40/10; B60W 30/02
See application file for complete search history.

(56) References Cited

U.S. PATENT DOCUMENTS

| | | | |
|---|---|---|---|
| 10,730,553 B2* | 8/2020 | Raad | B62D 15/024 |
| 2008/0036296 A1* | 2/2008 | Wu | B60W 50/06 303/146 |
| 2011/0022282 A1* | 1/2011 | Wu | B60D 1/58 701/70 |
| 2016/0039456 A1* | 2/2016 | Lavoie | B60D 1/62 701/41 |
| 2017/0341583 A1* | 11/2017 | Zhang | B60R 1/00 |
| 2018/0001928 A1* | 1/2018 | Lavoie | B60D 1/62 |
| 2019/0375454 A1* | 12/2019 | Kasaiezadeh Mahabadi | B62D 13/00 |

* cited by examiner

*Primary Examiner* — Jess Whittington
*Assistant Examiner* — Brian E Yang
(74) *Attorney, Agent, or Firm* — Cantor Colburn LLP (57) ABSTRACT

Examples of techniques for controlling a vehicle based on trailer sway are disclosed. In one example implementation according to aspects of the present disclosure, a computer-implemented method includes estimating, by a processing device, an estimated articulation angle between a vehicle and a trailer coupled to the vehicle. The method further includes calculating, by the processing device, an expected articulation angle between the vehicle and the trailer. The method further includes comparing, by the processing device, the estimated articulation angle and the expected articulation angle to determine whether the trailer is experiencing trailer sway. The method further includes, responsive to determining that the trailer is experiencing sway, controlling, by the processing device, the vehicle to reduce the trailer sway.

15 Claims, 6 Drawing Sheets

CONTROLLING A VEHICLE BASED ON TRAILER SWAY

INTRODUCTION

The subject disclosure relates to controlling a vehicle and, more particularly, to controlling a vehicle based on trailer sway.

Modern vehicles (e.g., a car, a motorcycle, a boat, or any other type of vehicle) generally include one or more cameras that provide backup assistance, take images of the vehicle driver to determine driver drowsiness or attentiveness, provide images of the road, as the vehicle is traveling, for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method comprises estimating, by a processing device, an estimated articulation angle between a vehicle and a trailer coupled to the vehicle. The method further comprises calculating, by the processing device, an expected articulation angle between the vehicle and the trailer. The method further comprises comparing, by the processing device, the estimated articulation angle and the expected articulation angle to determine whether the trailer is experiencing trailer sway. The method further comprises, responsive to determining that the trailer is experiencing sway, controlling, by the processing device, the vehicle to reduce the trailer sway.

In addition to one or more of the features described herein, in some examples the estimated articulation angle is estimated using a vision-based feature extraction technique using an image received from a camera associated with the vehicle. In some examples, the estimated articulation angle is estimated using an ultrasonic-based feature extraction technique using data received from a sensor associated with the vehicle. In some examples, it is determined that the trailer is experiencing trailer sway when the estimated articulation angle minus the expected articulation angle is greater than a threshold. In some examples, it is determined that the trailer is experiencing trailer sway when the expected articulation angle is oscillatory, an oscillation amplitude of the expected articulation angle is growing, and the oscillation amplitude of the expected articulation angle is greater than an amplitude threshold. Some examples further comprise sending an alert to an operator of the vehicle when it is determined that the trailer is experiencing sway. In some examples, controlling the vehicle to reduce trailer sway comprises performing at least one of applying brakes on the vehicle, performing a steering maneuver on the vehicle, and accelerating the vehicle. In some examples, the estimated articulation angle is an angle between a center line of the vehicle and a center line of the trailer. In some examples, the expected articulation angle is an angle between a center line of the vehicle and a center line of the trailer. In some examples, the articulation angle is based at least in part on a turning radius of the trailer, wherein the turning radius of the trailer is based at least in part on a steering angle of an inner road wheel of the vehicle.

In another exemplary embodiment, a system comprises a memory comprising computer readable instructions and a processing device for executing the computer readable instructions for performing a method. The method comprises estimating, by a processing device, an estimated articulation angle between a vehicle and a trailer coupled to the vehicle. The method further comprises calculating, by the processing device, an expected articulation angle between the vehicle and the trailer. The method further comprises comparing, by the processing device, the estimated articulation angle and the expected articulation angle to determine whether the trailer is experiencing trailer sway. The method further comprises, responsive to determining that the trailer is experiencing sway, controlling, by the processing device, the vehicle to reduce the trailer sway.

In addition to one or more of the features described herein, in some examples the estimated articulation angle is estimated using a vision-based feature extraction technique using an image received from a camera associated with the vehicle. In some examples, the estimated articulation angle is estimated using an ultrasonic-based feature extraction technique using data received from a sensor associated with the vehicle. In some examples, it is determined that the trailer is experiencing trailer sway when the estimated articulation angle minus the expected articulation angle is greater than a threshold. In some examples, it is determined that the trailer is experiencing trailer sway when the expected articulation angle is oscillatory, an oscillation amplitude of the expected articulation angle is growing, and the oscillation amplitude of the expected articulation angle is greater than an amplitude threshold. Some examples further comprise sending an alert to an operator of the vehicle when it is determined that the trailer is experiencing sway. In some examples, controlling the vehicle to reduce trailer sway comprises performing at least one of applying brakes on the vehicle, performing a steering maneuver on the vehicle, and accelerating the vehicle. In some examples, the estimated articulation angle is an angle between a center line of the vehicle and a center line of the trailer. In some examples, the expected articulation angle is an angle between a center line of the vehicle and a center line of the trailer. In some examples, the articulation angle is based at least in part on a turning radius of the trailer, wherein the turning radius of the trailer is based at least in part on a steering angle of an inner road wheel of the vehicle.

In yet another exemplary embodiment a computer program product comprises a computer readable storage medium having program instructions embodied therewith, the program instructions executable by a processing device to cause the processing device to perform a method. The method comprises estimating, by a processing device, an estimated articulation angle between a vehicle and a trailer coupled to the vehicle. The method further comprises calculating, by the processing device, an expected articulation angle between the vehicle and the trailer. The method further comprises comparing, by the processing device, the estimated articulation angle and the expected articulation angle to determine whether the trailer is experiencing trailer sway. The method further comprises, responsive to determining that the trailer is experiencing sway, controlling, by the processing device, the vehicle to reduce the trailer sway.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for controlling a vehicle having a trailer attached thereto when it is detected that the trailer is experiencing sway. The present techniques prevent a trailer (being attached to a vehicle) from swaying in a way that can cause vehicle and/or trailer instability, which can lead to a crash or other undesirable event.

Trailer sway occurs when a trailer moves side-to-side with respect to a center line of the vehicle towing the trailer while being towed. Trailer sway can be caused by a wind gust, slippery road conditions, improper driver commands, etc. If detected early enough, the vehicle can adjust its operation (e.g., steering, acceleration, braking, etc.) to minimize and/or eliminate the trailer sway.

The present techniques described herein detect trailer sway using cameras, sensors, and/or vehicle/trailer kinematics without the need for sensors being on the trailer itself. In this way, the present techniques utilize the cameras and sensors of the vehicle to detect trailer sway. Accordingly, the present techniques provide early trailer sway detection robust to vehicle dynamics, sensors noise, and trailer dynamics. Further, the present techniques compare driver inputs and desired trailer motions (kinematic based) with vision-based articulation angle estimation to distinguish between requested and unwanted sway.

This can be beneficial for automated driving, where real-time trailer and vehicle position monitoring is important for preventing sway detection. Existing approaches can be inaccurate and may require additional sensors on the trailer itself. The present techniques provide an improved technique for detecting trailer sway by estimating an articulation angle between a vehicle and a trailer coupled to the vehicle, calculating an expected articulation angle between the vehicle and the trailer, comparing the estimated articulation angle and the expected articulation angle to determine whether the trailer is experiencing trailer sway, and controlling the vehicle to reduce trailer sway when it is determined that the trailer is experiencing sway.

Figure 1:
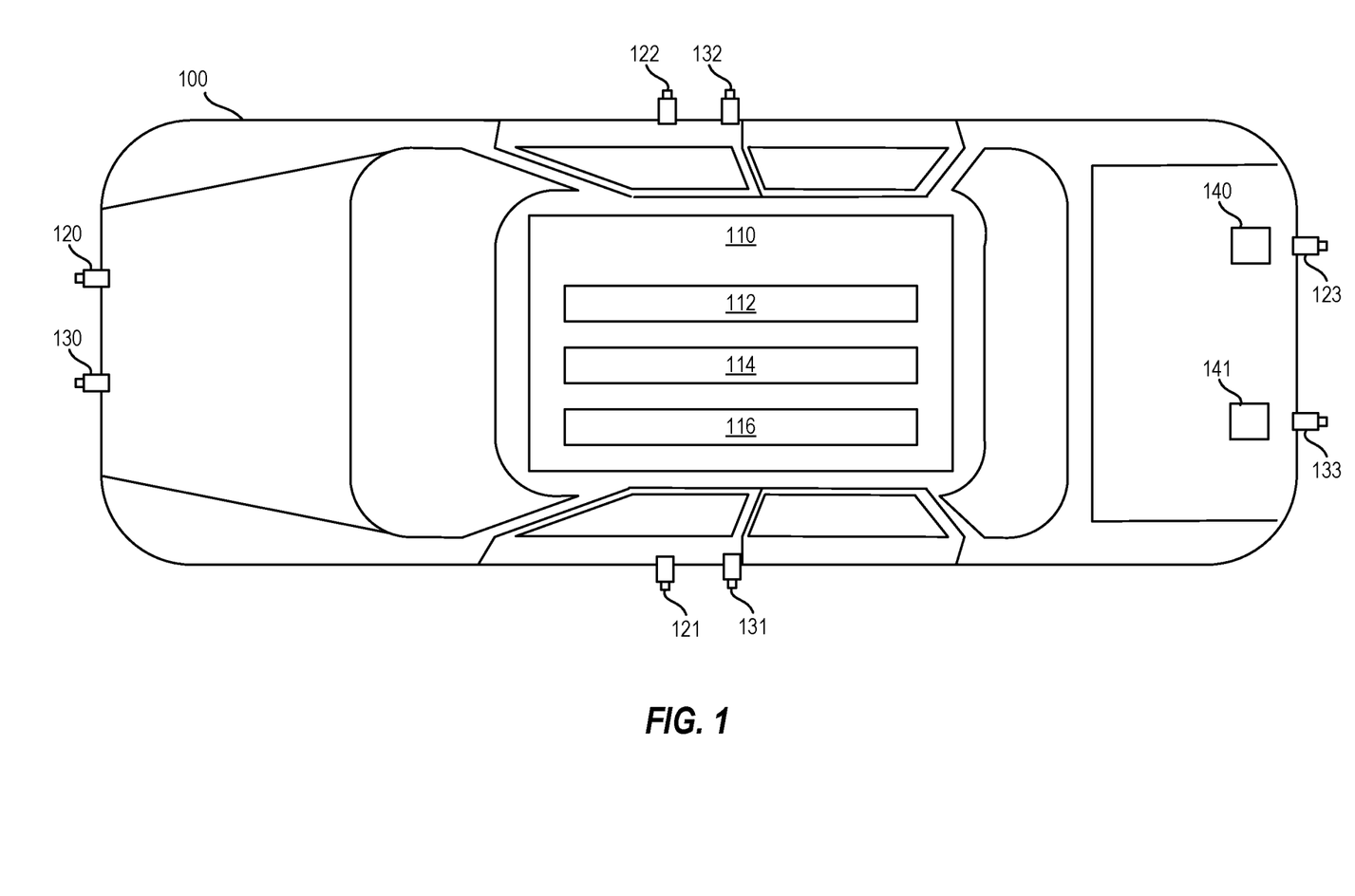
FIG. 1 depicts a vehicle including cameras, sensors, and a processing system for controlling the vehicle based, at least in part, on trailer sway according to one or more embodiments.

FIG. 1 depicts a vehicle 100 including a processing system 110 for controlling the vehicle 100 based at least in part on trailer sway. The vehicle 100 may be a car, truck, van, bus, motorcycle, or another suitable vehicle to which a trailer can be attached. The trailer can be attached to the vehicle 100 by a suitable connection, such as a tow hitch, a fifth-wheel coupling, or another suitable connection.

Figure 2:
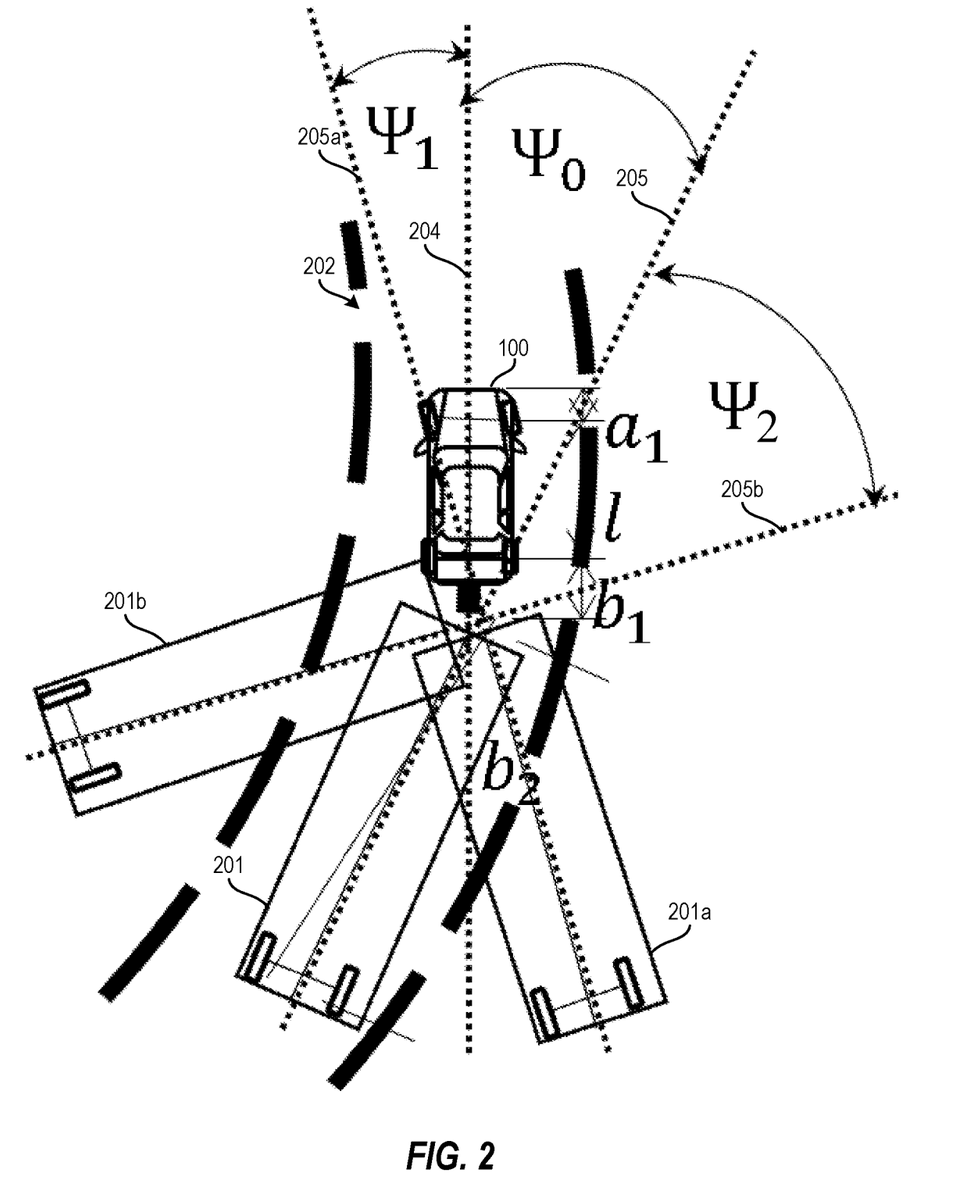
FIG. 2 depicts the vehicle of FIG. 1 having a trailer attached thereto according to one or more embodiments.

When the vehicle 100 and trailer (such as the trailer 201 of FIG. 2) traverse a road (such as the road 202 of FIG. 2), the trailer can tend to sway when the trailer experiences a gust of wind, when road conditions are slippery, or when a driver input is improper (e.g., oversteering, excessive speed, etc.), for example. With reference to FIG. 2, the trailer sway is shown. In particular, FIG. 2 depicts the vehicle 100 having a trailer 201 attached thereto according to one or more embodiments. The vehicle 100 is traveling along a road 202, which as shown, is curved. As the vehicle 100 navigates the curve, the trailer 201 follows the vehicle 100. The vehicle 100 travels along its center line (e.g., the center line 204), while the trailer 201 travels along its center line (e.g., the center line 205). When trailer sway occurs, the trailer 201 moves side-to-side with respect to the center line 204 of the vehicle 100. For example, the trailer 201 moves between positions 201$a$ and 201$b$, with respective center lines 205$a$ and 205$b$, relative to the center line 204. Using the present techniques, the vehicle 100 can be controlled to prevent and/or correct this problem.

An amount of trailer sway can be determined by calculating an articulation angle between the center line of the vehicle 100 and the center line of the trailer 201. The variable $\Psi_0$ represents the articulation angle between the center line 204 of the vehicle 100 and a center line 205 of the trailer 201; the variable $\Psi_1$ represents the articulation angle between the center line 204 of the vehicle 100 and a center line 205$a$ of the trailer 201 at the position 201$a$; and the variable $\Psi_2$ represents the articulation angle between the center line 204 of the vehicle 100 and a center line 205$b$ of the trailer 201 at the position 201$b$.

With continued reference to FIG. 2, $a_1$ represents the distance between the front of the vehicle 100 and the front axle of the vehicle 100; 1 represents the length of the wheelbase of the vehicle 100; $b_1$ represents the distance between the rear axle of the vehicle 100 and the rear of the vehicle 100; and $b_2$ represents the length of the trailer.

With continued reference to FIG. 1, the processing system 110 associated with the vehicle 100 aids in controlling the vehicle 100 based at least in part on detecting trailer sway. For example, the vehicle 100 can be controlled to cause the vehicle 100 and the trailer 201 to reduce sway by applying the brakes, accelerating, steering, and the like, depending on circumstances. To do this, the processing system 110 of the vehicle 100 utilizes a feature extraction engine 112, an articulation angle engine 114, and a vehicle control engine 116.

The feature extraction engine 112 performs feature extraction on the trailer using one or more cameras and/or one or more sensors. In particular, the vehicle 100 may include cameras 120, 121, 122, 123, and cameras 130, 131, 132, 133. The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be used for operating the vehicle (e.g., parking, backing, etc.). The cameras 130-133 are long-range cameras that capture images external to the vehicle and farther away from the vehicle 100 than the cameras 120-123. These images can be used for object detection and avoidance, for example. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The vehicle 100 can also include sensors, such as sensors 140, 141. According to one or more embodiments, the sensor 140 represents a high-resolution radar, and the sensor 141 represents a light imaging detection and ranging (Lidar) sensor. Other numbers and types of sensors can be used.

The feature extraction engine 112 uses images captured from one or more of the cameras 120-123, 130-133, and/or sensor data captured by one or more of the sensors 140, 141 to estimate an articulation angle between the vehicle 100 and the trailer 201. The images can be used to perform a vision-based feature extraction, and the sensor can be used to perform an ultrasonic-based feature extraction. Each of the vision-based and ultrasonic-based feature extractions estimates an articulation angle, which can be compared based on reliability, etc., to generate an estimated articulation angle.

The articulation angle engine 114 calculates an expected articulation angle between the vehicle 100 and the trailer 201 based on the kinematics of the vehicle 100 and the trailer 201. For example, steering angles of the front road wheels of the vehicle 100 can be used to calculate a turning radius of the vehicle 100 and the trailer 201. Using the turning radius, the articulation angle engine 114 can then calculate the articulation angle.

Once the articulation angle is calculated, the articulation angle engine 114 can then compare the estimated articulation angle and the expected articulation angle to determine whether the trailer is experiencing trailer sway. If trailer sway is detected, the vehicle control engine 116 can control the vehicle 100 to reduce trailer sway, such as by applying the brakes, accelerating, steering, and the like.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 621 of FIG. 6) for executing those instructions. Thus a system memory (e.g., the RAM 624 of FIG. 6) can store program instructions that when executed by the processing device implement the engines described herein. Other engines can also be utilized to include other features and functionality described in other examples herein.

Figure 3:
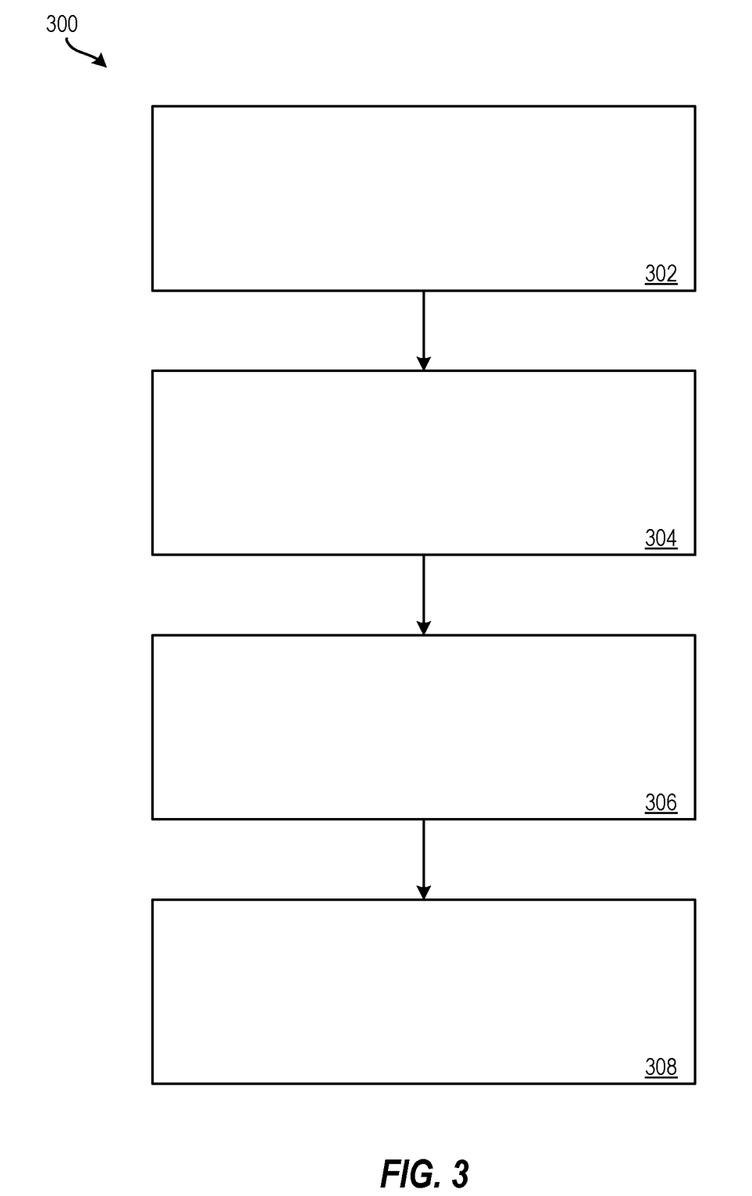
FIG. 3 depicts a flow diagram of a method for controlling a vehicle based, at least in part, on trailer sway according to one or more embodiments.

FIG. 3 depicts a flow diagram of a method 300 for controlling a vehicle based at least in part on trailer position according to one or more embodiments. The method 300 can be performed by any suitable processing system and/or processing device, such as the processing system 110 of FIG. 1, the processing system 600 of FIG. 6, or another suitable processing device and/or processing system.

At block 302, the feature extraction engine 112 estimates an estimated articulation angle between a vehicle (e.g., the vehicle 100) and a trailer (e.g., the trailer 201) coupled to the vehicle. The estimated articulation angle can be estimated using a vision-based feature extraction technique using an image received from a camera (e.g., one or more of the cameras 120-123, 130-133) associated with the vehicle and/or using an ultrasonic-based feature extraction technique using data received from a sensor (e.g., one or more of the sensors 140, 141) associated with the vehicle.

At block 304, the articulation angle engine 114 calculates an expected articulation angle between the vehicle and the trailer. The articulation angle is an angle between a center line of the vehicle and a center line of the trailer. The articulation angle can be based at least in part on a turning radius of the trailer, and the turning radius of the trailer can be based at least in part on a steering angle of an inner road wheel of the vehicle.

At block 306, the articulation angle engine 114 comparing the estimated articulation angle and the expected articulation angle to determine whether the trailer is experiencing trailer sway. According to one or more embodiments, it is determined that the trailer is experiencing trailer sway when the articulation angle minus the expected articulation angle is greater than a threshold. According to one or more embodiments, it is determined that the trailer is experiencing trailer sway when the articulation angle is oscillatory, an oscillation amplitude is growing, and the oscillation amplitude is greater than an amplitude threshold.

At block 308, the vehicle control engine 116 controls the vehicle to reduce the trailer sway when it is determined that the trailer is experiencing sway. Controlling the vehicle can including performing at least one of applying brakes on the vehicle, performing a steering maneuver on the vehicle, and accelerating the vehicle.

Additional processes also may be included. For example, the vehicle control engine 116 can send an alert to an operator of the vehicle when it is determined that the trailer is experiencing sway. It should be understood that the process depicted in FIG. 3 represents an illustration, and that other processes may be added or existing processes may be removed, modified, or rearranged without departing from the scope and spirit of the present disclosure.

Figure 4:
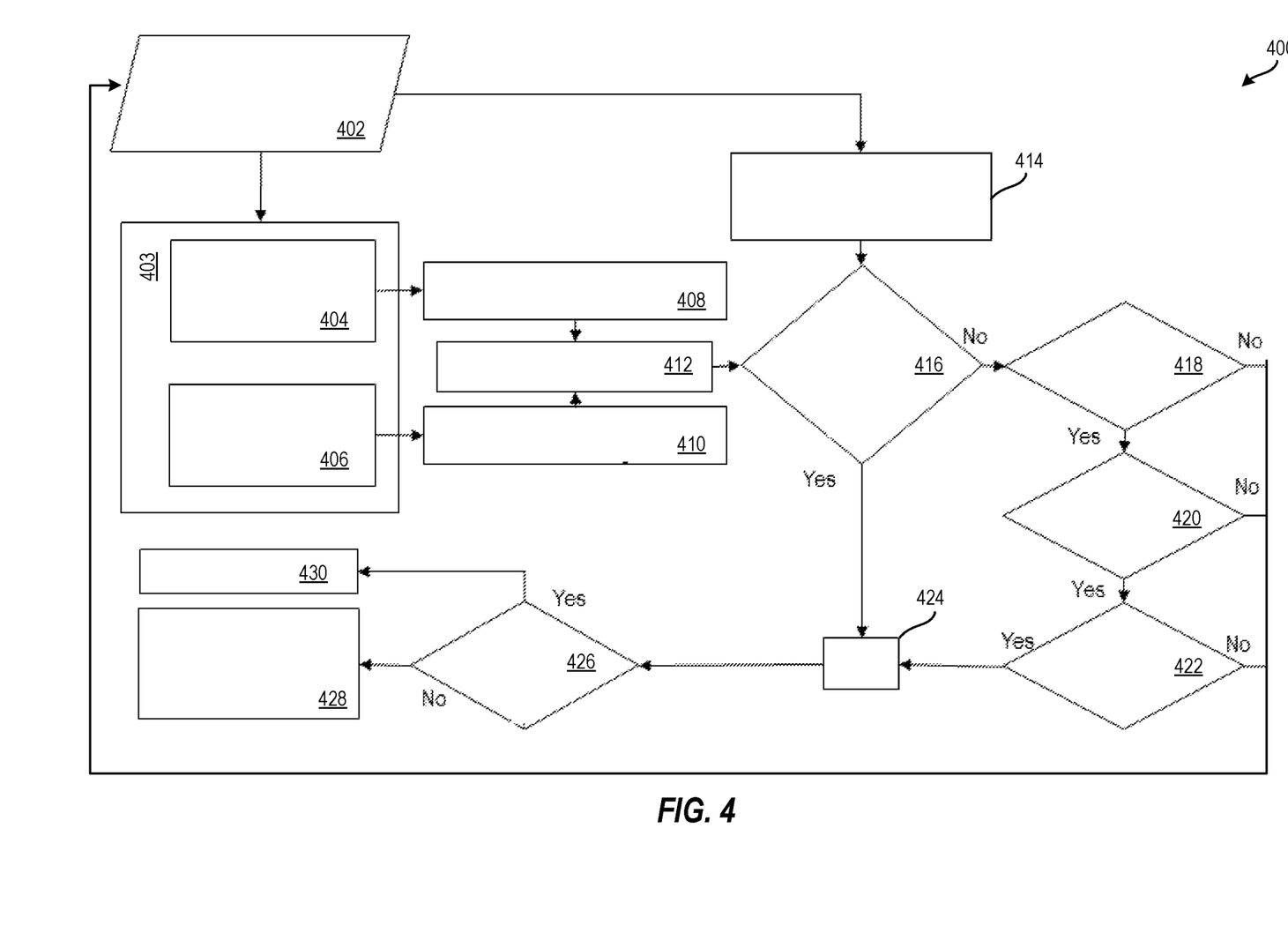
FIG. 4 depicts a flow diagram of a method for controlling a vehicle based, at least in part, on trailer sway according to one or more embodiments.

FIG. 4 depicts a flow diagram of a method 400 for controlling a vehicle based at least in part on trailer position according to one or more embodiments. The method 400 can be performed by any suitable processing system and/or processing device, such as the processing system 110 of FIG. 1, the processing system 600 of FIG. 6, or another suitable processing device and/or processing system.

At block 402, vehicle and trailer information is received, which may include for example: vehicle and/or trailer dimensions; camera positions on the vehicle; inertial measurement unit (IMU) sensor data; sensor data from the sensors 140, 141, images from the cameras 120-123, 130-133; and thresholds. The thresholds can include an articulation angle threshold $\Psi_{th}$, a change in articulation threshold $\Delta\Omega_{th}$, and an amplitude threshold $A_{th}$.

At block 403, feature extraction occurs. Feature extraction can be vision-based (block 404) and/or ultrasonic based (block 406). The vision-based feature extraction uses images from one or more of the cameras 120-123, 130-133 to estimate an articulation angle at block 408 for the trailer 201 relative to the vehicle 100. The vision-based feature extraction detects features on the trailer 201 using the images captured by one or more of the cameras 120-123, 130-133 to detect features (i.e., points of interest) on the trailer 201. These features can then be used to estimate the articulation angle of the trailer 201 relative to the vehicle 100 based on where those features are when the trailer 201 is in a neutral position (i.e., when the articulation angle is zero) relative to the vehicle 100.

The ultrasonic based feature extraction uses sensor data from one or more of the sensors 140, 141 to estimate an articulation angle at block 410 for the trailer 201 relative to the vehicle 100. The ultrasonic based feature extraction detects features on the trailer 201 using the sensor data captured by one or more of the sensors 140, 141 to detect features (i.e., points of interest) on the trailer 201. These features can then be used to estimate the articulation angle of the trailer 201 relative to the vehicle 100 based on where those features are when the trailer 201 is in a neutral position (i.e., when the articulation angle is zero) relative to the vehicle 100.

According to one or more embodiments, both the vision-based feature extraction (block 404) and the ultrasonic-based feature extraction (block 406) can be performed, although in some embodiments only one is performed. When both feature extractions are performed, the estimated articulation angles from block 408 and 410 can be compared at block 412 to determine a more accurate and reliable estimated articulation angle.

At block 414, an expected articulation angle is calculated based on the kinematics of the vehicle 100 and the trailer 201. The expected articulation angle is calculated based on a turning radius of the vehicle 100, which is based on a steering angle of at least an inner road wheel of the vehicle. For example, the turning radius of the vehicle 100 is expressed as $R_t$ and is calculated using the following equation:

$$R_t = \sqrt{\left(l\cot\delta_i + \frac{1}{2}w\right)^2 + b_1^2 - b_2^2},$$

where l represents a length of the wheelbase of the vehicle 100; $\delta_i$ represents a steering angle of an inner road wheel of the vehicle 100; w represents a width of the trailer 201; $b_1$ represents the distance between the rear axle of the vehicle 100 and the rear of the vehicle 100; and $b_2$ represents the length of the trailer.

Once the turn radius of the vehicle 100 is calculated, the expected articulation angle $\Psi$ is calculated at a moment in time k as follows:

$$\theta_k = \begin{cases} 2\tan^{-1}\left[\frac{1}{b_1 - b_2}\left(R_t \pm \sqrt{R_1^2 - b_1^2 - b_2^2}\right)\right] & b_1 - b_2 \neq 0 \\ 2\tan^{-1}\left[\frac{1}{2R_t}(b_1 + b_2)\right] & b_1 - b_2 = 0 \end{cases}.$$

At decision block 416, the estimated articulation angle (from block 412) and the expected articulation angle are compared to the change in articulation threshold $\Delta\Psi_{th}$ to determine whether trailer sway is occurring. In particular, the expected articulation angle is subtracted from the estimated articulation angle. If the difference is greater than the change in articulation threshold $\Delta\Psi_{th}$, the method 400 proceeds to block 424. However, if the difference between the expected and estimated articulation angles is not greater than the change in articulation threshold $\Delta\Psi_{th}$, the method 400 proceeds to decision block 418.

Figure 5A:
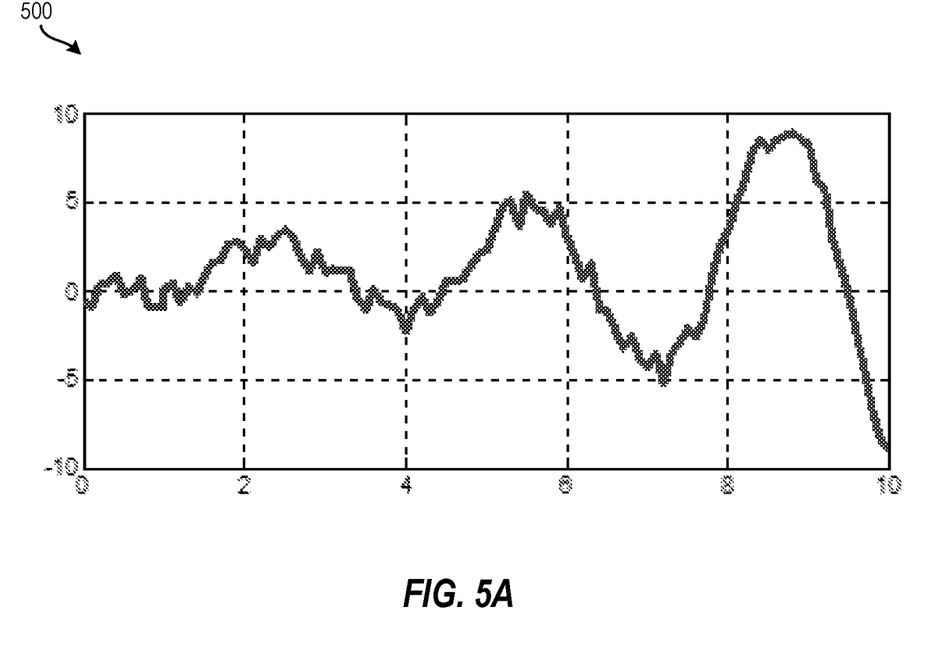
FIG. 5A depicts a graph of articulation angle over time of a trailer sway according to one or more embodiments.
Figure 5B:
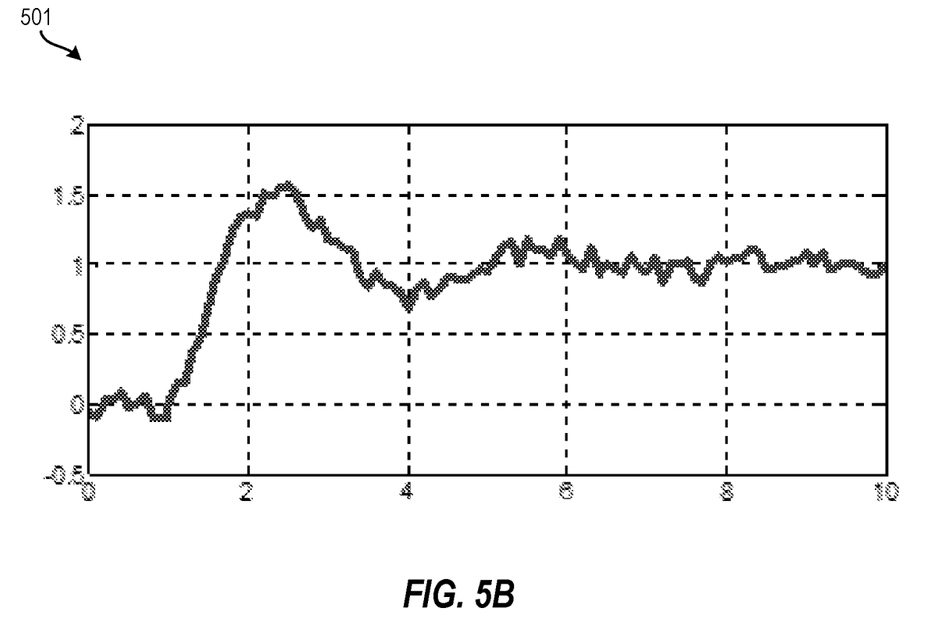
FIG. 5B depicts a graph of articulation angle over time of a trailer sway according to one or more embodiments.

At decision block 418, it is determined whether the articulation angle is oscillatory. FIG. 5A depicts a graph 500 that shows the articulation angle being oscillatory. If at decision block 418 it is determined that the articulation angle is oscillatory, it is determined at decision block 420 whether the oscillation amplitude is growing. The graph 500 of FIG. 5A shows the articulation angle growing in amplitude. With continued reference to FIG. 4, if at decision block 420 it is determined that the articulation angle is growing in amplitude, it is determined at decision block 422 whether the oscillation amplitude is greater than the amplitude threshold $A_{th}$. If so, the method 400 proceeds to block 424. However, if it is determined at any of decision blocks 418, 420, 422 that the condition is negative (i.e., the articulation angle is not oscillatory, the oscillation amplitude is not growing, and the oscillation amplitude is not greater than the amplitude threshold $A_{th}$), the method 400 returns to block 402 and restarts (or ends). FIG. 5B depicts a graph 501 that shows the articulation angle not growing in amplitude.

With continued reference to FIG. 4, at block 424, if either condition from blocks 416 or 422 is affirmative, trailer sway is determined to be present. At block 426, the trailer sway can be compared to a control threshold to determine whether to control the vehicle 100 automatically at block 428 and/or to alert an operator of the sway condition at block 430.

Additional processes also may be included, and it should be understood that the process depicted in FIG. 4 represents an illustration, and that other processes may be added or existing processes may be removed, modified, or rearranged without departing from the scope and spirit of the present disclosure.

Figure 6:
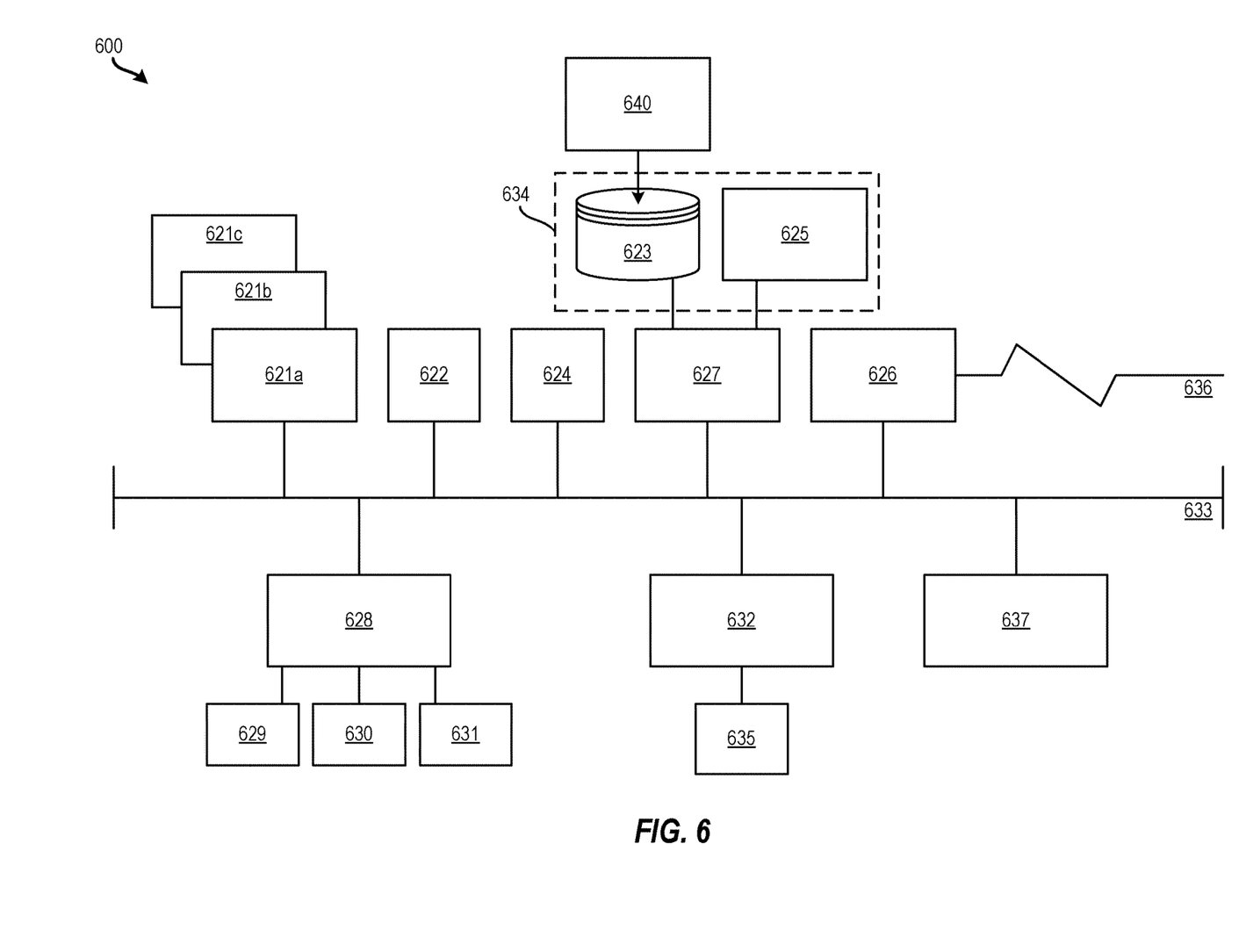
FIG. 6 depicts a block diagram of a processing system for implementing the techniques described herein according to aspects of the present disclosure.

It is understood that the present disclosure is capable of being implemented in conjunction with any other type of computing environment now known or later developed. For example, FIG. 6 depicts a block diagram of a processing system 600 for implementing the techniques described herein. In examples, processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or other storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adaptor 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 (for instance) may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store an operating system to coordinate the functions of the various components shown in processing system 600.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method comprising:
   estimating, by a processing device, an estimated articulation angle between a vehicle and a trailer coupled to the vehicle;
   calculating, by the processing device, an expected articulation angle between the vehicle and the trailer;
   comparing, by the processing device, the estimated articulation angle and the expected articulation angle to determine whether the trailer is experiencing trailer sway; and
   responsive to determining that the trailer is experiencing sway, controlling, by the processing device, the vehicle to reduce the trailer sway,
   wherein it is determined that the trailer is experiencing trailer sway when the estimated articulation angle minus the expected articulation angle is greater than a threshold,
   wherein the expected articulation angle is calculated based at least in part on a turning radius of the vehicle, which is based at least in part on a steering angle of at least an inner road wheel of the vehicle,
   wherein the turning radius of the vehicle is expressed as $R_t$ and is calculated using the following equation:

$$R_t = \sqrt{\left(l\cot\delta_i + \frac{1}{2}w\right)^2 + b_1^2 - b_2^2}$$

where l represents a length of a wheelbase of the vehicle; $\delta_i$ represents a steering angle of an inner road wheel of the vehicle; w represents a width of the trailer; $b_1$ represents the distance between a rear axle of the vehicle and a rear of the vehicle; and $b_2$ represents a length of the trailer, and
   wherein the expected articulation angle is expressed as $\Psi$ and is calculated at a moment in time k using the following equation:

$$\theta_k = \begin{cases} 2\tan^{-1}\left[\frac{1}{b_1-b_2}\left(R_t \pm \sqrt{R_t^2 - b_1^2 - b_2^2}\right)\right] & b_1 - b_2 \neq 0 \\ 2\tan^{-1}\left[\frac{1}{2R_t}(b_1 + b_2)\right] & b_1 - b_2 = 0 \end{cases}.$$

2. The computer-implemented method of claim 1, wherein the estimated articulation angle is estimated using a vision-based feature extraction technique using an image received from a camera associated with the vehicle.

3. The computer-implemented method of claim 1, wherein the estimated articulation angle is estimated using an ultrasonic-based feature extraction technique using data received from a sensor associated with the vehicle.

4. The computer-implemented method of claim 1, wherein it is determined that the trailer is experiencing trailer sway when the estimated articulation angle is oscillatory, an oscillation amplitude of the estimated articulation angle is growing, and the oscillation amplitude of the estimated articulation angle is greater than an amplitude threshold.

5. The computer-implemented method of claim 1, further comprising:
   sending an alert to an operator of the vehicle when it is determined that the trailer is experiencing sway.

6. The computer-implemented method of claim 1, wherein controlling the vehicle to reduce trailer sway comprises performing at least one of applying brakes on the vehicle, performing a steering maneuver on the vehicle, and accelerating the vehicle.

7. The computer-implemented method of claim 1, wherein the estimated articulation angle is an estimated angle between a center line of the vehicle and a center line of the trailer.

8. The computer-implemented method of claim 1, wherein the expected articulation angle is an expected angle between a center line of the vehicle and a center line of the trailer.

9. A system comprising:
a memory comprising computer readable instructions; and
a processing device for executing the computer readable instructions for performing a method comprising:
estimating, by the processing device, a first estimated articulation angle between a vehicle and a trailer coupled to the vehicle using a vision-based feature extraction technique using an image received from a camera associated with the vehicle;
estimating, by the processing device, a second estimated articulation angle between the vehicle and the trailer coupled to the vehicle using an ultrasonic-based feature extraction technique using data received from a sensor associated with the vehicle;
comparing, by the processing device, the first estimated articulation angle and the second estimated articulation angle to determine a final estimated articulation angle that is a more accurate and reliable estimated articulation angle;
calculating, by the processing device, an expected articulation angle between the vehicle and the trailer;
comparing, by the processing device, the final estimated articulation angle and the expected articulation angle to determine whether the trailer is experiencing trailer sway; and
responsive to determining that the trailer is experiencing sway, controlling, by the processing device, the vehicle to reduce the trailer sway,
wherein the expected articulation angle is calculated based at least in part on a turning radius of the vehicle, which is based at least in part on a steering angle of at least an inner road wheel of the vehicle,
wherein the turning radius of the vehicle is expressed as $R_t$ and is calculated using the following equation:

$$R_t = \sqrt{\left(l\cot\delta_i + \frac{1}{2}w\right)^2 + b_1^2 - b_2^2}$$

where l represents a length of a wheelbase of the vehicle; $\delta_i$ represents a steering angle of an inner road wheel of the vehicle; w represents a width of the trailer; $b_1$ represents the distance between a rear axle of the vehicle and a rear of the vehicle; and $b_2$ represents a length of the trailer, and
wherein the expected articulation angle is expressed as $\Psi$ and is calculated at a moment in time k using the following equation:

$$\theta_k = \begin{cases} 2\tan^{-1}\left[\frac{1}{b_1-b_2}\left(R_t \pm \sqrt{R_t^2 - b_1^2 - b_2^2}\right)\right] & b_1 - b_2 \neq 0 \\ 2\tan^{-1}\left[\frac{1}{2R_t}(b_1+b_2)\right] & b_1 - b_2 = 0 \end{cases}.$$

10. The system of claim 9, wherein it is determined that the trailer is experiencing trailer sway when the final estimated articulation angle minus the expected articulation angle is greater than a threshold.

11. The system of claim 9, wherein the method further comprises:
sending an alert to an operator of the vehicle when it is determined that the trailer is experiencing sway.

12. The system of claim 9, wherein controlling the vehicle to reduce trailer sway comprises performing at least one of applying brakes on the vehicle, performing a steering maneuver on the vehicle, and accelerating the vehicle.

13. The system of claim 9, wherein the final estimated articulation angle is an angle between a center line of the vehicle and a center line of the trailer.

14. The system of claim 9, wherein the expected articulation angle is an angle between a center line of the vehicle and a center line of the trailer.

15. A computer program product comprising:
a computer readable storage medium having program instructions embodied therewith, the program instructions executable by a processing device to cause the processing device to perform a method comprising:
estimating, by the processing device, an estimated articulation angle between a vehicle and a trailer coupled to the vehicle;
calculating, by the processing device, an expected articulation angle between the vehicle and the trailer;
comparing, by the processing device, the estimated articulation angle and the expected articulation angle to determine whether the trailer is experiencing trailer sway; and
responsive to determining that the trailer is experiencing sway, controlling, by the processing device, the vehicle to reduce the trailer sway,
wherein the expected articulation angle is calculated based at least in part on a turning radius of the vehicle, which is based at least in part on a steering angle of at least an inner road wheel of the vehicle,
wherein the turning radius of the vehicle is expressed as $R_t$ and is calculated using the following equation:

$$R_t = \sqrt{\left(l\cot\delta_i + \frac{1}{2}w\right)^2 + b_1^2 - b_2^2}$$

where l represents a length of a wheelbase of the vehicle; $\delta_i$ represents a steering angle of an inner road wheel of the vehicle; w represents a width of the trailer; $b_1$ represents the distance between a rear axle of the vehicle and a rear of the vehicle; and $b_2$ represents a length of the trailer, and
wherein the expected articulation angle is expressed as $\Psi$ and is calculated at a moment in time k using the following equation:

$$\theta_k = \begin{cases} 2\tan^{-1}\left[\frac{1}{b_1-b_2}\left(R_t \pm \sqrt{R_t^2 - b_1^2 - b_2^2}\right)\right] & b_1 - b_2 \neq 0 \\ 2\tan^{-1}\left[\frac{1}{2R_t}(b_1+b_2)\right] & b_1 - b_2 = 0 \end{cases}.$$

* * * * *